United States Patent [19]

Yatabe et al.

[11] 4,234,654

[45] Nov. 18, 1980

[54] HEAT WAVE-REFLECTIVE OR ELECTRICALLY CONDUCTIVE LAMINATED STRUCTURE

[75] Inventors: Toshiaki Yatabe, Hino; Shigenobu Sobajima; Ikuto Sugiyama, both of Hachioji, all of Japan

[73] Assignee: Teijin Limited, Osaka, Japan

[21] Appl. No.: 56,192

[22] Filed: Jul. 9, 1979

[30] Foreign Application Priority Data

Jul. 11, 1978 [JP] Japan .................................. 53-83582

[51] Int. Cl.$^3$ ...................... B32B 7/02; B32B 27/36; B32B 15/04
[52] U.S. Cl. .................................. 428/333; 428/215; 428/434; 428/472
[58] Field of Search ................ 428/215, 434, 472, 333

[56] References Cited

U.S. PATENT DOCUMENTS

| | | | |
|---|---|---|---|
| 3,698,946 | 10/1972 | Kospaul | 428/472 |
| 3,962,488 | 6/1976 | Gillery | 427/109 |
| 4,017,661 | 4/1977 | Gillery | 428/472 |
| 4,020,389 | 4/1977 | Dickson | 427/66 |
| 4,166,876 | 9/1979 | Chiba et al. | 428/472 |

FOREIGN PATENT DOCUMENTS

| | | |
|---|---|---|
| 693528 | 8/1967 | Belgium . |
| 840513 | 4/1970 | Canada . |
| 2813394 | 10/1978 | Fed. Rep. of Germany . |
| 2828576 | 1/1979 | Fed. Rep. of Germany . |
| 2043002 | 2/1971 | France . |
| 1307642 | 2/1973 | United Kingdom . |

OTHER PUBLICATIONS

Publication No. 66841/76, Laid Open Date Jun. 9, 1976, Japan.

*Primary Examiner*—William J. Van Balen
*Attorney, Agent, or Firm*—Wenderoth, Lind & Ponack

[57] ABSTRACT

A heat wave-reflective or electrically conductive laminated structure composed of (A) a shaped solid substrate, (B) a transparent thin layer having a high refractive index in contact with said substrate (A), (C) a transparent heat wave-reflective layer of an electrically conductive metal in contact with said layer (B), and (D) optionally, a transparent thin layer having a high refractive index (D') in contact with said layer (C) and a transparent top layer (D") in contact with said transparent thin layer (D'); characterized in that said layer (C) is a layer composed of Ag and Au in which the amount of Au is 3 to 30% by weight based on the total weight of Ag and Au.

12 Claims, No Drawings

HEAT WAVE-REFLECTIVE OR ELECTRICALLY CONDUCTIVE LAMINATED STRUCTURE

This invention relates to a heat wave-reflective or electrically conductive laminated structure having various superior properties, and as a result of containing a thin layer of electrically conductive Ag together with a small amount of Au in a specified range, exhibiting markedly improved light stability, resistance to heat degradation and chemical resistance.

More specifically, this invention relates to a heat wave-reflective or electrically conductive laminated structure composed of (A) a shaped solid substrate,
(B) a transparent thin layer having a high refractive index in contact with said substrate (A),
(C) a transparent heat wave-reflextive layer of an electrically conductive metal in contact with said layer (B), and
(D) optionally, a transparent thin layer having a high refractive index (D') in contact with said layer (C) and a transparent top layer (D") in contact with said transparent thin layer (D');

characterized in that said layer (C) is a layer composed of Ag and Au in which the amount of Au is 3 to 30% by weight based on the total weight of Ag and Au.

A great number of suggestions about a heat wave reflective or electrically conductive laminated structure or the like have been made in many patent documents including U.S. Pat. Nos. 3,698,946, 3,962,488, 4,017,661 and 4,020,389, Japanese Laid-Open Patent Publication No. 66841/76, British Pat. No. 1307642 French Patent No. 2043002, Belgian Patent No. 693528, Canadian Patent No. 840513, and west German OLS Nos. 2813394 and 2828576.

Transparent conductive layers have been widely used in applications utilizing their electric conductivity, for example in electrical and electronic fields as electrodes for liquid crystal display, electrodes for electroluminescence, electrodes for photoconductive photosensitive materials, antistatic layers, and heaters.

Selectively light-transmitting layers are also useful as transparent thermal insulating layers because they are transparent to light in the visible region but have the ability to reflect infrared light (including near infrared light). Accordingly, they can be used in solar energy collectors (water heaters), power generation by solar energy, and window portions of greenhouses and buildings. In particular, these layers will gain increasing importance because of their ability to act as transparent heat insulating windows which utilize solar energy and prevent dissipation of energy in modern buildings in which the windows occupy a large proportion of the wall surface. They are also important as films for greenhouses in agriculture which are used in cultivating vegetables and fruits.

Thus, the transparent conductive layers and selectively light-transmitting layers are important from the standpoint of electronics and the utilization of solar energy, and it is desired in the art to provide large quantities of such films of uniform quality and high performance at low cost.

Known transparent thin layers of electrically conductive metal disclosed in the above-mentioned patent documents and elsewhere include (i) thin films of metals such as gold, copper, silver, and palladium, (ii) thin films of compound semiconductors such as indium oxide, tin oxide and copper iodide, and (iii) thin films of electrically conductive metals such as gold, silver, copper and palladium which are made selectively transparent over a certain wavelength region. Indium oxide or tin oxide films having a thickness of several thousand Angstroms and laminates of metallic films and transparent conductive films are known to be selectively transparent and have a high ability to reflect infrared radiation. However, transparent electrically conductive films or selectively light-transmitting films having superior performances have not been produced commercially at low cost.

The above-cited west German OLS No. 2813394 discloses a transparent, electrically conductive laminated structure composed of (A) a transparent solid substrate,
(B) a thin layer of an oxide of titanium in contact with said substrate (A),
(C) a thin layer of an electrically conductive metal in contact with said layer (B),
(D) a thin layer of an oxide of titanium in contact with said layer (C), and
(E) optionally, a transparent top layer in contact with said layer (D), characterized in that (i) said substrate (A) is a film-forming synthetic resin layer, and
(ii) said layer (B) is a layer of an oxide of titanium derived from a layer of an organic titanium compound and containing an organic residual moiety of said organic titanium compound.

In this patent document, a unitary thin metal layer containing both silver and copper is recommended as a preferred species of the thin layer (C) of electrically conductive metal. In particular, the use of layer (C) composed of Ag and Cu with a Cu content of 1 to 30% by weight based on the total weight of Ag and Cu is recommended.

The west German OLS No. 2828576 recommends the use of a thin layer of a metal selected from gold, silver, copper, aluminum, and mixtures or alloys of at least two of these.

To the best of the knowledges of the present inventors, however, none of the prior literature disclose a heat wave-reflective or electrically conductive laminated structure having an Ag layer containing a small amount of Au within the range specified in the present invention as the thin layer of electrically conductive metal.

The present inventors noted that the conventional laminated structures, when used in windows of buildings, have unsatisfactory durability under environmental service conditions including light, heat and polluted gases, and made investigations in order to provide a laminated structure having superior properties as a heat wave-reflective or electrically conductive laminated structure and being free from the aforesaid disadvantages.

The present inventors found that when a known laminated structure having a $TiO_2$ layer as the layers (B) and (D) and an Ag layer as the layer (C) is exposed to (a) a high-temperature atmosphere of about 60° C. to 120° C.,
(b) strong light irradiation in the air or a long time irradiation of relatively weak light, or
(c) an atmosphere of a reactive gas such as ozone or a gas containing sulfur such as hydrogen sulfide, its electrically conductive properties, heat wave-reflecting properties, and visible light transmittance are deteriorated fairly markedly. The inventors also found that this degradation is due mainly to the diffusion of silver into titanium oxide, and when copper and silver are made to coexist, the above degrading trouble can be remedied but only to an insufficient degree.

Further investigations led to the discovery that by forming the thin layer (C) from a layer of Ag and Au containing 3 to 30%, preferably 5 to 30% by weight, based on the total weight of Ag and Au, the diffusion of silver into titanium oxide can be greatly inhibited, and the above degradation can be remedied with a far greater effect.

It has also been found that since gold is chemically more stable than copper, manufacturing conditions for the formation of the thin transparent layer (B) having a high refractive index on a metal layer can be easily set, and the resulting laminated structure has greater chemical stability.

Surprisingly, it has been found that the presence of a suitable amount of gold in the thin silver layer brings about an improvement in the optical characteristics of a laminated structure comprising the thin silver layer and the thin transparent layer having a high refractive index.

The various improving effects achieved by the copresence of Au in a specific minor amount are unexpected results. As is well known from the Tamman Law (for example, see Annalen Der Physik, V Folge, Band 1, 1929, pages 309–317), a bulk alloy obtained by adding at least 50 atomic % of a noble metal to a less noble metal has chemical resistance almost the same as that of the noble metal. Although this law was empirically derived, it has been ascertained that it is applicable to a fairly wide area of metals. According to the Tamman Law, a gold/silver alloy containing 50 atomic % (i.e., 65% by weight) of gold shows the same chemical resistance as gold. In addition, the Tamman Law holds good with sufficiently annealed bulk alloys, but in the case of a thin metal layer such as the one used in the present invention, a noble metal must be added in a larger amount than the anticorrosive bulk alloy mentioned in the Tamman Law because of the effects of the great increase of the surface area, the nonuniformity of surfaces by vacuum deposition or sputtering, the increased crystallographic defects, and the increased activity of the new surface formed by vacuum deposition or sputtering. In other words, it is expected that to increase the chemical stability of a thin metallic layer composed mainly of silver close to that of gold, the gold will have to be added in an amount of at least 50 atomic %, i.e. at least 65% by weight.

Unexpectedly, it has been found in accordance with this invention that chemical resistance, corrosion resistance, durability to light and heat can be improved and the disadvantages in the prior art can be overcome completely, by using a layer composed of Ag and Au with an Au content of 3 to 30% by weight based on the total weight of Ag and Au as the thin layer (C) of electrically conductive metal.

It is an object of this invention therefore to provide a heat wave-reflextive or electrically conductive laminated structure having markedly improved properties by forming a thin layer of electrically conductive metal containing Ag and a minor amount with a specified range of Au.

The above and other objects and advantages of this invention will become more apparent from the following description.

The mechanism by which the copresence of a minor amount of Au brings about an improvement in light stability, resistance to heat degradatin, and corrosion resistance has not yet been elucidated. It is theorized however that the presence of gold facilitates the formation of a nucleus for the early stage of vacuum deposition of a metal layer, and thus aids in the formation of a thinner continuous layer, and can give a compact layer having a reduced loss of Ag by scattering.

A very small amount of gold present together with silver in forming the transparent thin layer (C) of electrically conductive metal is effective. To achieve a heat degradation resistance time (the time which elapses until the reflectance of infrared ray of 10 $\mu$m decreases to 80%) of at least 500 hours at 90° C., the amount of gold is preferably at least 3% based on the total weight of Ag and Au. Durability can be further increased by using gold in an amount of at least 5% by weight.

Since the color of the resulting laminate somewhat changes according to the amount of gold to be copresent with silver, the amount of gold to be added can be selected according to the color that suits for a particular use. With increasing content of gold, the color changes from a bluish shade to a golden shade, and when the thickness of a layer is the same, its visible light transmittance decreases with increasing content of gold. Environmental stability tends to be enhanced with increasing content of gold, but when the content of gold exceeds 30%, adverse effects on the optical characteristics become outstanding and nullify the effect of increasing the environmental stability. Accordingly, the content of gold in the thin metal layer (C) is preferably from 3% by weight to 30% by weight, and from the standpoint of hormony between optical characteristics and environmental stability, the amount of gold is more preferably from 5% by weight to 28% by weight, especially from 10% by weight to 25% by weight.

The thickness of the thin metal layer (C) is not particularly limited if it has the properties required of a transparent electrically conductive film or a selectively light-transmitting film. However, to achieve heat wave reflecting ability or electrical conductivity, the thin metal layer (C) should be continuous within a certain region. Preferably, the thickness of the layer (C) at a portion having a continuous structure contiguous to an island-like structure is at least about 50 Å, and from the standpoint of transparency to solar energy, it is preferably not more than 500 Å. Since the light-pervious region is broadened with smaller thickness of the thin metal layer, the thickness of the layer is preferably not more than 200 Å in order to increase transparency, and to impart sufficient electric conductivity or the ability to reflect heat wave, the thickness of the layer is preferably at least 100 Å.

Known means can be used to form the thin metal layer (C). For example, there can be used a vacuum deposition method, a cathode sputtering method, a plasma flame spraying method, a vapor phase plating method, an electroless plating method, an electroplating method, a chemical coating method, and combinations of these methods. When the shaped solid substrate (A) has a smooth surface as in sheets or films, the vacuum deposition method is especially suitable from the standpoint of the uniformity of the resulting thin layer, the ease of production and the speed of formation of the layer.

To maintain the proportions of silver and gold in the layer as uniformly as possible, a method for sputtering alloys or a multiplicity of metals is suitable. In the vacuum, deposition process, it is preferred to deposit a multiplicity of metals, or an alloy sample using an electron beam heating, high frequency induction heating, resistance heating, or flash evaporation in combination.

The thin metal layer (C) used in the laminated structure of this invention is a single layer of metal containing both gold and silver. This means a thin metal film in which silver atom and gold atom are substantially copresent. It may be completely uniform, or to some degree, nonuniform, but is present at least as a single layer.

Another metal component may be co-present in a minor amount which does not adversely affect the results to be obtained by this invention, for example, up to about 3% by weight based on the total weight of Ag and Au.

In the laminated structure of this invention, the transparent heat wave-reflecting thin layer (B) in contact with the shaped solid substrate (A) has a refractive index of at least 1.6, preferably at least 1.7, to visible light, and a visible light transmittance of at least 80%, preferably at least 90%. The thickness of the layer (B) is preferably 50 to 1,000 Å, and more preferably 100 to 500 Å. Thin layers of titanium dioxide, titanium oxide, zirconium oxide, bismuth oxide, zinc sulfide, tin oxide and indium oxide have been found to meet these requirements. These thin layers can be formed by known such as sputtering, ion plating, vacuum deposition, and wet-method coating.

A thin layer of an oxide of titanium is preferred as the layer (B) because it has superior optical characteristics. An especially preferred layer (B) is a thin layer of an oxide of titanium derived from a layer of an organic titanium compound and containing an organic residual moiety of the organic titanium compound. The layer (B) of an oxide of titanium containing an organic residual moiety and its formation are described in detail in the above-cited west German L OLS No. 2813394, and can be utilized in the present invention.

The layer (B) can be formed, for example, by using an organic solvent solution of a solute containing an alkyl titanate as a main ingredient. The alkyl titanate can be represented by the general formula $Ti_lO_mR$ in which R is an alkyl group, and l, m and n are positive integers. Those of the above general formula in which $m=4+(l-1)\times 3$, $n=4+(l-1)\times 2$, and $l=1$ to 30 are preferred because of the ease of film formation (for example, coating) or the characteristics of the resulting dielectric layer. The value l needs not to be a single value, and may be distributed. Especially, alkyl titanates of the above general formula in which l has such a distribution that its maximum value exists at 15 or below are preferred in regard to the viscosity of the resulting coating solution and the hydrolyzability of the alkyl titanate. In the above general formula, the alkyl substituent R preferably contains 1 to 20 carbon atoms. Alkyl titanates of the above formula in which R is an alkyl group containing 2 to 11 carbon atoms are preferred in regard to the ease of coating, the rate of hydrolysis, and the mechanical properties and transparency of the resulting layer. The alkyl titanates may be used singly or as a mixture.

When the alkyl titanate is dissolved in an organic solvent and the solution is coated on the surface of a shaped article, it is hydrolyzed by moisture in the atmosphere. Condensation reaction which occurs subsequently results in the elimination of alkyl hydroxide to form a network structure. By selecting the conditions for coating, the amount of the organic residual moiety of the organic titanium compound contained in the layer (B) and the amount of the titanium compound converted can be controlled. The amount of titanium oxide is preferably 70 to 99.9% by weight, more preferably 90 to 99.5% by weight, based on the weight of the layer (B) in the dry state. The content of the organic residual moiety is preferably 0.1 to 30% by weight, more preferably 0.5 to 10% by weight, based on the organic groups containing in the layer (B) in the dry state. When the amount of the organic residual moiety is too small, the adhesion of the layer (B) to the substrate (A) is reduced. If it is too large, the transparency of the resulting layer is reduced. Thus, it is preferably limited to the above range.

Examples of the alkyl titanate are tetrabutyl titanate, tetraethyl titanate, tetrapropyl titanate, tetrastearyl titanate, tetra-2-ethylhexyl titanate, and diisopropoxytitanium bis-acetyl acetonate. Above all, tetrabutyl titanate and a tetrapropyl titanate are preferred. These alkyl titanates may be used directly, and their precondensation products in the form of, for example, a dimer, tetramer or decamer can also be used preferably.

Also, these alkyl titanates may be stabilized with acetylacetone prior to use.

Suitable organic solvents generally used for film formation from the alkyl titanates are those which fully dissolve the alkyl titanates, have affinity for the surface of the shaped solid substrate (A) and which are easy to coat and permit easy drying of the coated film. Examples of such organic solvents include hydrocarbons, alcohols, ethers, esters, carboxylic acids and halogenated hydrocarbons, such as hexane, cyclohexane, heptane, octane, methylcyclohexane, toluene, benzene, xylene, octene, nonene, solvent naphtha, methanol, ethanol, isopropanol, butanol, pentanol, cyclohexanol, methylcyclohexanol, phenol, cresol, ethyl ether, propyl ether, tetrahydrofuran, dioxane, acetone, cyclohexanone, methyl ethyl ketone, methyl isobutyl ketone, methyl acetate, ethyl acetate, propyl acetate, butyl acetate, ethyl propionate, methyl benzoate, glacial acetic acid, chloroform, carbon tetrachloride, trichloroethylene, trichloroethane, chlorobenzane, dibromoethane, methyl Cellosolve, and Cellosolve, Cellosolve acetate. Among these, isopropanol, butanol, n-hexane and toluene are preferred. These organic solvents can be used singly or as a mixture. If desired, water-containing solvents may be used.

If desired, heating to a temperature of about 5° to about 100° C. may be employed in forming the organic solvent solution of an organic titanium compound. To improve the adhesion, refractive index, color, hardness, etc. of the coated film, some amount of another ingredient soluble in organic solvents may be added. Examples of such an ingredient are solvent-soluble resins such as silicon-containing resins, acrylic resins, epoxy resins and polyurethane resins.

The concentration of the organic solvent solution of the alkyl titanate is optional, but to provide a thin layer of several hundred Angstroms, it is advisable to adjust the concentration of the alkyl titanate to 0.1 to 30% by weight, preferably 0.5 to 10% by weight, especially 1 to 7.5% by weight. The solution can be coated on the surface of the shaped substrate by various methods, for example, a dipping method, a spray method, a spinner method, and methods utilizing general coating machines such as a gravure coater, a Myer bar coater, or a reverse roller coater. When applying the coating solution to a substrate having a smooth surface such as a film or sheet, the use of a gravure coater or a Myer bar coater is preferred from the standpoint of the control and uniformity of the thickness of the coated film. The spraying method is preferred for coating on a non-smooth substrate.

Simultaneously with, or after, the coating of the solution, the coating is dried at a temperature above room temperature, and if desired, heat-treated to complete the coating process. The drying or heat treating temperature is 50° to 200° C., and the treating time is about 10 seconds to about 10 hours.

As a result of the coating in this way, the alkyl titanate is hydrolyzed to form a thin layer of titanium oxide (B) containing a residual organic moitety derived from the alkyl titanate.

The refractive index of the thin layer (B) of the oxide of titanium containing an organic residual moiety in accordance with a preferred embodiment of this invention is lower than that of a conventional $TiO_2$ layer, and is about 1.6 to 2.4 in a visible light region. By the use of this thin layer (B), the light transmittance of the layer (B) is uniform over a large area. The layer (B) has superior adhesion to the substrate (A). The superior adhesion is especially advantageous when the substrate is made of such a material as a polyester. Another advantage is that the light transmittance of the layer (B) has a high light transmittance over a wide range of wavelengths in the visible region.

In the laminate structure of this invention the thickness of the thin layer (B) of the oxide of titanium is preferably 50 to 1000 Å, more preferably 200 to 500 Å.

Optionally, the laminated structure of this invention may further contain a transparent thin layer having a high refractive index (D') in contact with the layer (C) and a transparent top layer (D'') in contact with said transparent thin layer (D'). The layer (D') is a layer similar to the layer (B), and is preferably a layer of an oxide of titanium. More preferably, it is a thin layer of an oxide of titanium derived from a layer of an organic titanium compound and containing an organic residual moiety of the organic titanium compound such as the one described hereinabove with regard to the layer (B). Better results are obtained by using such a layer containing an oxide of titanium containing organic residual moieties as the layer (D').

A shaped solid substrate made of an organic material, an inorganic material or a combination of these can be used as the shaped solid substrate (A) in the laminated structure of this invention.

Shaped solid substrates made of an organic material are preferred. Organic synthetic resins are preferred as such organic material. Specific examples of the resin include thermoplastic resins such as polyethylene terephthalate, polyethylene naphthalate, polycarbonate, acrylic resin, ABS resin, polystyrene, polyacetal, polyethylene, polypropylene, polyamides, and fluorocarbon resins; thermosetting resins such as epoxy resins, diallyl phthalate resins, silicon resins, unsaturated polyester resins, phenolic resins and urea resins; and solvent-soluble resins such as polyvinyl alcohol, polyacrylonitrile, polyurethane, aromatic polyamides, and polyimides. These are in the form of homopolymers or copolymers and are used either singly or as a mixture.

The shape, color, etc. of the substrate (A) can be properly selected. The shape may for example, be plaete-like, sheet-like, film-like, rod-like, thread-like, block-like or pipe-like. Furthermore, according to the end use of the product, it may be colored, non-colored, transparent, or non-transparent.

The laminated structure having the layers (B), (C), and optionally (D') and (D'') on the surface of the transparent shaped solid substrate is used as a transparent electrode or an antistatic layer. The laminated structure having the above layers with superior selective light-transmitting ability is preferably used as a selectively light-transmitting material for the effective utilization of sunlight, and/or as an energy saving material by utilizing its thermal insulating property. In the laminated structure including the above layers on the surface of a colored solid substrate, electric conductivity can be imparted without impairing the color of the shaped substrate. It is useful, for example, for static prevention of the shaped solid substrate. The laminated structure of the invention comprising a colored solid substrate and formed on the surface thereof the above layers having the superior ability to reflect infrared light can have the ability to reflect infrared light without impairing the color or design of the shaped solid substrate. The laminated structure composed of a substrate colored to a color which well absorbs sunlight, such as black, and formed on the surface thereof, the above layers having superior ability to transmit light selectively, absorbs sunlight well, and can be effectively used as a selectively light-absorbing material with reduced heat irradiation.

When this selectively light-absorbing material is used as a heat absorber of a solar energy water heater for obtaining warm water by utilizing sunlight, the efficiency of utilization of the heat of sun can be markedly increased.

For example, when the surface of a shaped solid substrate which permits passage of water, such as a pipe is colored to a color which well absorbs sunlight, and the laminated structure having superior ability to transmit light selectively in accordance with this invention is formed on the colored surface, the resulting structure can be effectively used as a solar heat collector owing to such an effect of selective light absorption.

A sheet or film or an organic synthetic resin is preferred as the shaped solid substrate (A) in the laminated structure of this invention because it has the advantage that the laminated structure of this invention can be formed continuously. The laminated structure of This invention having a sheet or film of a flexible organic synthetic resin has the advantage that it is light in weight, has good flexibility and good resistance to breakage and is easy to process. For example, it is used preferably as a transparent electrode for electroluminisence, a transparent electrode for a photoconductive photosensitive material, and a thermal insulating film provided on or near windowpanes to prevent heat loss from the windows. Since the substrate is a sheet or film, it can be produced continuously, and the speed of production can be increased greatly and good materials can be supplied in large quantities. Such a substrate has a high industrial value. For this purpose, a film having a visible light transmittance of at least 80% and a thickness of 10 to 250 μm, especially polyethylene terephthalate films, are preferred.

The laminated structure of this invention having a film as the substrate (A) may be transferred to the surface of another shaped article such as a glass plate.

The transparent top layer (D") may be laminated on the laminated structure of this invention to improve surface hardness, weatherability, adhesive strength, etc. Examples of the material for such a layer (D") include organic materials, for example acrylic resins such as poly(methyl methacrylate), silicon resins such as a polymer derived from ethyl silicate, melamine resins and fluorocarbon resins, and inorganic materials such as silicon oxide or mangnesium fluoride. The acrylic resins and silicon resins are especially preferred with it is desired to improve weatherability or surface hardness.

By controlling the thickness of the thin metal layer (C) of the laminated structure and the thickness of the thin layer (B) or (D') of an oxide of titanium, and the method of laminating them, the visible light transmittance, surface resistance and infrared reflectance of the laminated structure can be freely changed as required. The laminated structure so obtained has the following typical applications.

(a) A transparent electrically conductive laminate used in an antistatic or photoconductive photosensitive layer;

(b) a transparent electrode for a solid display of or panel illuminator such as a liquid crystal electroilluminator;

(c) a transparent panel heater used as a heater such as a defrost heater for the windows of motor vehicles; and (d) a transparent thermal insulating laminate to be applied to the glass portions of windowpanes of buildings, greenhouses, and refrigerating and cooled showcases.

The thickiness of the protective surface top layer (D") is not particularly limited. Generally, it is 0.05 to 10 microns, preferably 0.1 to 5 microns. If the thickness is larger than 10 microns, the heat wave reflecting ability of the laminated structure is reduced because the top layer absorbs infrared light. If the thickness is below 0.05 micron, the top layer does not have abrasion resistance, and cannot serve the function of a protective layer. Thicknesses of about 0.5 to 1.3 microns are what is called interference film thickness, although it depends upon the refractive index of the protective top layer (D"). Such thicknesses should better be avoided depending upon the end use of the laminated structure because it would lead to the generation of rainbow-colored interference fringes.

The top layer (D") having a thickness of about 0.2 micron is obtained, for example, by dissolving an acrylate resin (for example, Dianal LR 574, a product of Mitsubishi Rayon Co., Ltd.) in methyl isobutyl ketone to form a 1% by weight solution, coating the solution by a bar coater, and drying the coated film.

The laminated structure of this invention has the characteristic features shown below which are not obtainable by the prior art.

(1) The environmetal stability of the laminated structure can be greatly improved by using a thin film containing both silver and gold instead of a thin silver layer heretofore used.

(2) The laminated structure of the invention has superior transparency over a wide wavelength region.

When a thin layer of an oxide of titanium containing an organic residual moiety derived from an organic titanium compound is used as the transparent highly reflective thin layer (B), the following advantages can further be obtained.

(3) Heretofore, a transparent electrically conductive layer or selectively light-pervious layer having a large area has not been obtained, but the present invention can give the specified laminated structure of a large area.

(4) Heretofore, the thin layer (B) having a high refractive index has been formed by sputtering, and therefor has been unable to be formed on an organic film. In contrast, the laminated structure of this invention can be produced using a shaped article of an organic material such as a polyethylene terephthalate film as a substrate.

(5) According to the prior art, sputtering or reactive vacuum deposition is used, and therefore, the thin layer (B) obtained has considerably varying compositions. According to this invention, a thin titanium oxide layer (B) having little variation in composition can be formed because it can be formed under mild conditions, for example by a coating process.

(6) When the layer (B) of the laminated structure of this invention is a thin layer of titanium oxide, it has good adhesion to a shaped article, especially to an organic shaped substrate, because it contains an organic residual moiety derived from the organic titanium compound.

(7) The laminated structure of this invention has superior flexibility.

The following Examples illustrate the present invention more specifically.

The light transmittance values are those are those at a wavelength of 500 nm unless otherwise indicated.

The infrared reflectance was measured by an infrared spectrophotometer (Model EPI-II, a product of Hitachi Limited) provided with a reflectance measuring device. The reflectance of a structure obtained by vacuum deposition of silver to a sufficient thickness (about 3000 Å) on a slide glass was taken as 100%.

The amount of the organic residual moiety contained in the thin layer of titanium oxide derived from an organic titanium compound was measured as follows:

A sample laminate was cut into square-shaped small pieces each side measuring about 2 mm. These pieces were dipped at room temperature for 24 hours in a solution consisting of 1,000 parts by weight of water, 20 parts by weight of ethanol and 1 part by weight of hydrochloric acid to extract the organic components. The amount of the organic components was obtained from the quantitative determination of the ions by mass fragmentgraphy on a gas chromatographic mass analyzer (Model KLB-900 made by Shimadzu Seisakusho Co., Ltd.) using a glass column, 3 mm in diameter and 3 m in length, packed with Chromosorb W (60–80 mesh) having 30 parts by weight of PEG-20 attached to it.

The proportions of elements in the thin metallic layer were determined by a fluorescent X-ray analyzing method using a fluorescent X-ray analyzer (made by Rigaku Denki Co., Ltd.).

EXAMPLE 1

To a biaxially oriented polyethylene terephthalate film having a light transmittance of 86% and a thickness of 75 microns were successively laminated a thin layer of titanium oxide having a thickness of 300 Å as a first layer, a 160 Å thick thin layer of silver and gold as a second layer (5% by weight of gold and 95% by weight of silver), and a thin layer of titanium oxide having a thickness of 300 Å as a third layer to form a laminated structure having transparency, electric conductivity and selective light transmission.

Both of these thin layers of titanium oxide were provided by applying a solution consisting of 3 parts of a tetramer of tetrabutyl titanate, 65 parts of isopropyl alcohol and 32 parts of n-hexane by a bar coater, and heating the resulting coating at 100° C. for 5 minutes.

The single thin layer of gold and silver was formed by low-temperature magnetron sputtering using a silver-gold alloy (5% of gold, 95% of silver).

The first and third layers contain had a butyl group content of 5.5% as determined by mass fragmentgraphy of a sample (Mass No. 56).

The resulting film had a light transmittance of 78%, a surface resistance of 13 ohms per square meter and an infrared reflectance of 97%. The film was exposed for 1,000 hours to a carbon arc light fastness tester (Model CW-DV3 made by Shimadzu Seisakusho CO., Ltd.), and then its infrared reflectance was measured. The infrared reflectance was more than 80% either when the carbon arc light was irradiated from the side of the coating, or when it was irradiated from the side of the polyethylene terephthalate film.

EXAMPLES 2 to 5

In each run, a transparent, electrically conductive and selectively-light transmitting laminated film was produced in the same way as in Example 1 except that the proportions of the starting metals of the second layer were changed as shown in Table 1.

TABLE 1

| Example | Proportions of starting metals (wt. %) | | Proportions of metals in the thin metallic layer (wt. %) | | Thickness of the metal layer (Å) |
|---|---|---|---|---|---|
| | Gold | Silver | Gold | Silver | |
| 2 | 5 | 95 | 5 | 95 | 180 |
| 3 | 8 | 92 | 8 | 92 | 180 |
| 4 | 15 | 85 | 15 | 85 | 180 |
| 5 | 20 | 80 | 20 | 80 | 180 |

Each of the laminated films had a visible light transmittance of more than 75%, and an infrared reflectance of more than 95%.

Each of the films was placed in Geer aging testers set at a temperature of 90° C. and 120° C., respectively to perform a heat degradation test. The average time which elapsed until the infrared reflectance of the film decreased beyond 80% was measured, and the results are shown in Table 2.

TABLE 2

| Example | Heat degrading test at 90° C. | Heat degrading test at 120° C. |
|---|---|---|
| 2 | 500 hours | 180 hours |
| 3 | 600 | 200 |
| 4 | 850 | 280 |
| 5 | 1100 | 350 |

COMPARATIVE EXAMPLE 1

A laminated film was produced in the same way as in Example 1 except that the second layer was composed only of silver (layer thickness 180 Å).

The film was subjected to carbon arc irradiation and heat degradation test in the same way as in Example 1 and 2. The results are shown in Table 3. The average time which elapsed until the infrared reflectance of the film decreased beyond 80% was determined in each case. The results are shown in Table 3.

TABLE 3

| Carbon arc test | Heat degradation test at 90° C. | Heat degradation test at 120° C. |
|---|---|---|
| 50 hours | 100 hours | 50 hours |

In either case, the degrees of degradation were large, and the film had very bad environmental stability.

COMPARATIVE EXAMPLE 2

A laminated film was produced in the same way as in Example 1 except that the second thin metal layer was formed of copper and silver (91% by weight of silver, and 9% by weight of copper). The resulting laminated film was subjected to the same carbon arc irradiation and heat degradation tests as in Examples 1 and 2. The results are shown in Table 4.

TABLE 4

| Heat degradation test at 90° C. | Heat degradation test at 120° C. | Carbon arc irradiation |
|---|---|---|
| 300 hours | 60 hours | 800 hours |

EXAMPLES 6 to 12

In each run, a transparent, electrically conductive and selectively light-transmitting laminated film was produced in the same way as in Example 1 except that the proportions of the metal in the second layer were changed as shown in Table 5.

The resulting films has a visible light transmittance of more than 73%, and an infrared reflectance of more than 95%.

TABLE 5

| Example | Proportions of metal (wt. %) | | Thickness of the metal layer (second layer) (Å) |
|---|---|---|---|
| | Gold | Silver | |
| 6 | 0 | 100 | 180 ± 10 |
| 7 | 1 | 99 | " |
| 8 | 3 | 97 | " |
| 9 | 5 | 95 | " |
| 10 | 10 | 90 | " |
| 11 | 20 | 80 | " |
| 12 | 30 | 70 | " |

An acrylate resin (Dianal LR574, a product of Mitsubishi Rayon Co., Ltd.) was coated on each of the resulting films by a bar coater, and dried for 3 minutes in a hot air dryer held at 120° C. to form an acrylic protective layer having a thickness of 2 microns. The resulting films having a protective top layer had a visible light transmittance of more than 67% and an infrared reflectance of more than 88%.

These films were subjected to the same carbon arc test as in Example 1 and to the same heat degradation test at 90° C. as in Examples 2 to 5. Furthermore, each of the films was dipped for 60 minutes in 1 N HCl, and the changes were observed. The results are shown in Table 6.

The carbon arc light fastness test was performed by exposing the sample to carbon arc for 1,000 hours, and then its reflectance to infrared ray (10 microns) was determined. The heat degradation test was performed by allowing the sample to stand for 1,000 hours in a hot air dryer held at 90° C., and then its reflectance to infrared ray (10 microns) was determined.

TABLE 6

| Example | Carbon arc test (%) | 90° C. heat degradation test (%) | Test for chemical resistance (1N HCl) |
|---|---|---|---|
| 6 | 15 | 20 | Many spottings occurred, and peeled portions also existed. |
| 7 | 27 | 35 | Spottings occurred. |
| 8 | 83 | 80 | No change |
| 9 | 85 | 82 | No change |
| 10 | 82 | 82 | No change |
| 11 | 84 | 83 | No change |
| 12 | 86 | 81 | No change |

EXAMPLES 13 to 15

A transparent, electrically conductive and selectively light-transmitting laminated film was produced in the same way as in Example 1 except that the proportions of the metals in the metal thin metal layer as the second layer were changed as shown in FIG. 7.

The resulting films had a visible light transmittance of more than 75%, and an infrared reflectance of more than 95%.

TABLE 7

| Example | Proportions of metals (wt. %) | | | Thickness of the metal layer (Å) |
|---|---|---|---|---|
| | Silver | Gold | Copper | |
| 13 | 100 | 0 | 0 | 185 |
| 14 | 90 | 0 | 10 | 185 |
| 15 | 80 | 20 | 0 | 185 |

Each of these films was placed in a sealed container containing air with 1800 ppm of $H_2S$ gas for 2 hours, and then its infrared reflectance was measured. The results are shown in Table 8.

TABLE 8

| Example | Infrared reflectance (%) |
|---|---|
| 13 | 35 |
| 14 | 18 |
| 15 | 81 |

EXAMPLES 16 to 20

A transparent, electrically conductive and selectively light-transmitting laminated film was produced in the same way as in Example 1 except that the proportions of metal in the second layer were changed as shown in Table 9.

The resulting films had a visible light transmittance of more than 75%, and an infrared reflectance of more than 95%.

TABLE 9

| Example | Proportions of metals (wt. %) | | | Thickness of the metal layer (Å) |
|---|---|---|---|---|
| | Silver | Gold | Copper | |
| 16 | 100 | 0 | 0 | 180 ± 10 |
| 17 | 98 | 2 | 0 | " |
| 18 | 95 | 5 | 0 | " |
| 19 | 80 | 20 | 0 | " |
| 20 | 90 | 0 | 10 | " |

An acrylate resin (Dianal LR574, a product of Mitsubishi Rayon Co., Ltd.) was coated on each of the film, and dried for 3 minutes in a hot air dryer set at 120° C. to form a protective top layer having a thickness of 2 microns. The films had a visible light transmittance of more than 67% and an infrared reflectance of more than 88%.

A solution of sodium hypochlorite in a concentration of 100 ppm was sprayed onto each of these films three times a day to determine the corrosion resistance of the thin metal layer. The state of corrosion of each film is shown in Table 10.

TABLE 10

| Example | State of corrosion |
|---|---|
| 16 | Spot-like light brown corrosion occurred |
| 17 | Corrosion occurred as small spots of light brown color. |
| 18 | Almost no change |
| 19 | Almost no change |
| 20 | Corrosion occurred as light brown spots and transparent spots appeared. |

EXAMPLES 21 to 23

To the polyester film used in Example 1 were successively laminated a thin layer of titanium oxide having a thickness of 300 Å as a first layer, a thin layer of an alloy composed mainly of Ag and having a thickness of 180±10 Å as a second layer, and a thin layer of titanium oxide having a thickness of 300 Å as a third layer to form a transparent, electrically conductive and selectively light-transmitting laminated structure.

The thin layer of titanium oxide as the first and third layer was formed by sputtering in a low-temperature magnetron sputtering device using a sintered body of titanium oxide as a target and argon as a discharge gas.

The metal layer was similarly formed by a low-temperature magnetron sputtering method using an alloy target.

The resulting films had a visible light transmittance of more than 78%, and an infrared reflectance of more than 95%.

TABLE 10

| Example | Proportions of metals (wt. %) | | | Thickness of metal layer (Å) |
|---|---|---|---|---|
| | Silver | Gold | Copper | |
| 21 | 100 | 0 | 0 | 180 ± 10 |
| 22 | 80 | 20 | 0 | " |
| 23 | 90 | 0 | 10 | " |

The resulting films were each exposed to carbon arc for 1000 hours in the same carbon arc light stability tester as used in Example 1, and the infrared reflectance of each film at 10 μm was measured.

Each of the resulting films was dipped for 24 hours in a 0.1 mole aqueous citric acid solution. Separately, each film was dipped for 1 hour in a 1 N aqueous HCl solution. The results are summarized in Table 11.

TABLE 11

| Example | Carbon arc irradiation, infrared reflectance (%) | State of corrosion | |
|---|---|---|---|
| | | 1N HCl test | 0.1 M citric acid test |
| 21 | 40 | spot-like light brown corrosion occurred. | Corrosion occurred; partly dissolved. |
| 22 | 85 | Almost no change | Almost no change |
| 23 | 87 | Corrosion occurred; partly | Corrosion occurred; partly |

TABLE 11-continued

| Example | Carbon arc irradiation, infrared reflectance (%) | State of corrosion | |
|---|---|---|---|
| | | 1N HCl test | 0.1 M citric acid test |
| | | dissolved. | dissolved. |

What we claim is:

1. A heat wave-reflective or electrically conductive laminated structure composed of
   (A) a shaped solid substrate,
   (B) a transparent thin layer having a high refractive index in contact with said substrate (A),
   (C) a transparent heat wave-reflective layer of an electrically conductive metal in contact with said layer (B), and
   (D) optionally, a transparent thin layer having a high refractive index (D') in contact with said layer (C) and a transparent top layer (D'') in contact with said transparent thin layer (D');
   characterized in that said layer (C) is a layer composed of Ag and Au in which the amount of Au is 3 to 30% by weight based on the total weight of Ag and Au.

2. The laminated structure of claim 1 wherein the amount of Au in the layer (C) is 5 to 30% by weight based on the total weight of Ag and Au.

3. The laminated structure of claim 1 wherein the amount of Au in the layer (C) is 10 to 25% by weight based on the total weight of Ag and Au.

4. The laminated structure of claim 1 wherein the layer (B) is a thin layer of an oxide of titanium.

5. The laminated structure of claim 4 wherein the layer (B) is a thin layer of an oxide of titanium derived from a layer of an organic titanium compound and containing an organic residual moiety of the organic titanium compound.

6. The laminated structure of claim 1 wherein which contains the layer (D').

7. The laminated structure of claim 6 wherein the layer (D') is a thin layer of an oxide of titanium derived from a layer of an organic titanium compound and containing an organic residual moiety of the organic titanium compound.

8. The laminated structure of claim 5 wherein the content of the organic moiety is 0.1 to 30% by weight based on the organic groups contained in the layer (B) in the dry state of the organic titanium compound.

9. The laminated structure of claim 1 wherein the substrate (A) is a shaped article of an organic synthetic resin.

10. The laminated structure of claim 1 wherein the layer (B) has a thickness of 50 to 1,000 Å.

11. The laminated structure of claim 1 wherein the layer (C) has a thickness of 50 to 500 Å.

12. The laminated structure of claim 1 wherein the laminated structure has the layer (D') having a thickness of 50 to 1,000 Å.

* * * * *